United States Patent [19]

Suzuki et al.

[11] 4,313,534

[45] Feb. 2, 1982

[54] DEVICE FOR UNLOADING BOTTLE-SHAPED CONTAINERS

[75] Inventors: Sadao Suzuki, Tokyo; Yoshiyuki Ichizawa, Sohka; Nobuichi Seki, Tokyo, all of Japan

[73] Assignee: Yoshino Kogyosho Co., Ltd., Tokyo, Japan

[21] Appl. No.: 100,913

[22] Filed: Dec. 6, 1979

[30] Foreign Application Priority Data

Dec. 28, 1978 [JP] Japan ................................ 53-162045

[51] Int. Cl.³ ............................................ B65G 47/34
[52] U.S. Cl. .................................... 198/484; 198/486; 198/490; 198/628; 198/690
[58] Field of Search ................ 414/416; 198/483, 484, 198/485, 486, 489, 490, 597, 598, 627, 628, 690

[56] References Cited

U.S. PATENT DOCUMENTS

| | | | |
|---|---|---|---|
| 2,758,731 | 8/1956 | Davis | 198/628 X |
| 3,018,007 | 1/1962 | Williams et al. | 198/486 X |
| 3,406,808 | 10/1968 | Babunovic | 198/483 |
| 3,985,239 | 10/1976 | Bowers | 198/489 X |

Primary Examiner—James L. Rowland
Attorney, Agent, or Firm—Stevens, Davis, Miller & Mosher

[57] ABSTRACT

A device for unloading a product or a light bottle-shaped container of synthetic resin from a predetermined jig for engaging the container throughout the production line from an injection molding machine. This device incorporates a turntable for holding a number of jigs at equal central angle intervals at its periphery, a rocking unit relatively rotatably rocking to turn at the same speed in the same direction as the turntable and to then return to the original position faster than the previous speed, and a pair of linking mechanisms supported by a supporting arm to the rocking unit for unloading the container engaged by the jig. Thus, this device can continuously, rapidly and exactly feed the unloaded container to the next step.

6 Claims, 5 Drawing Figures

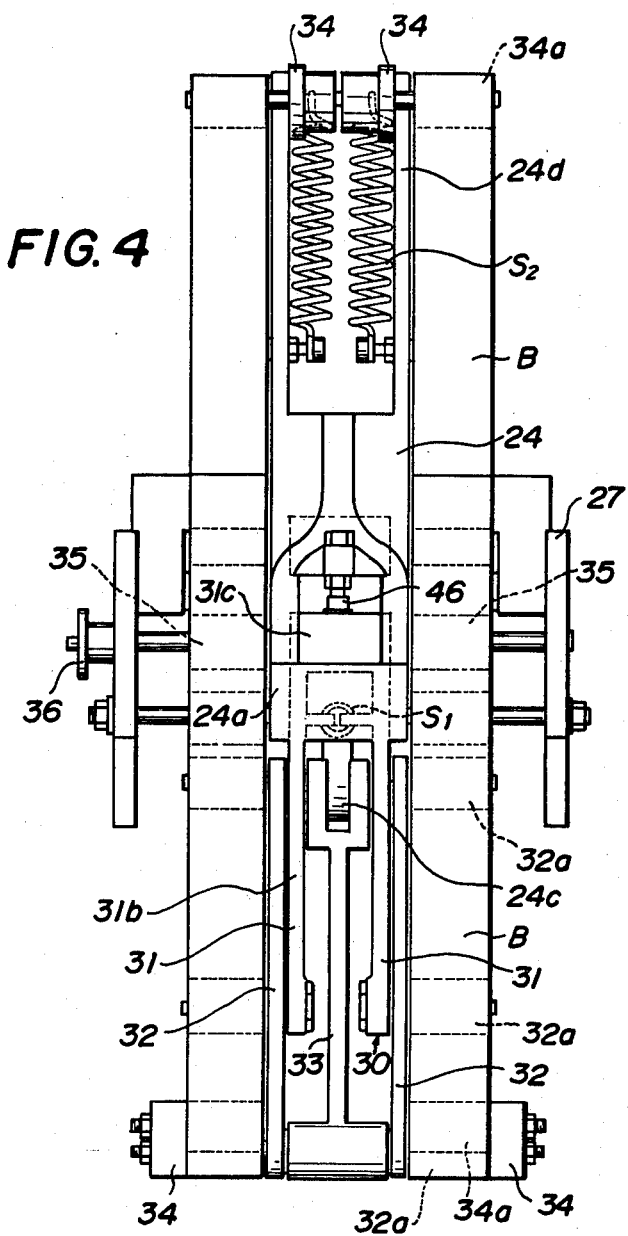

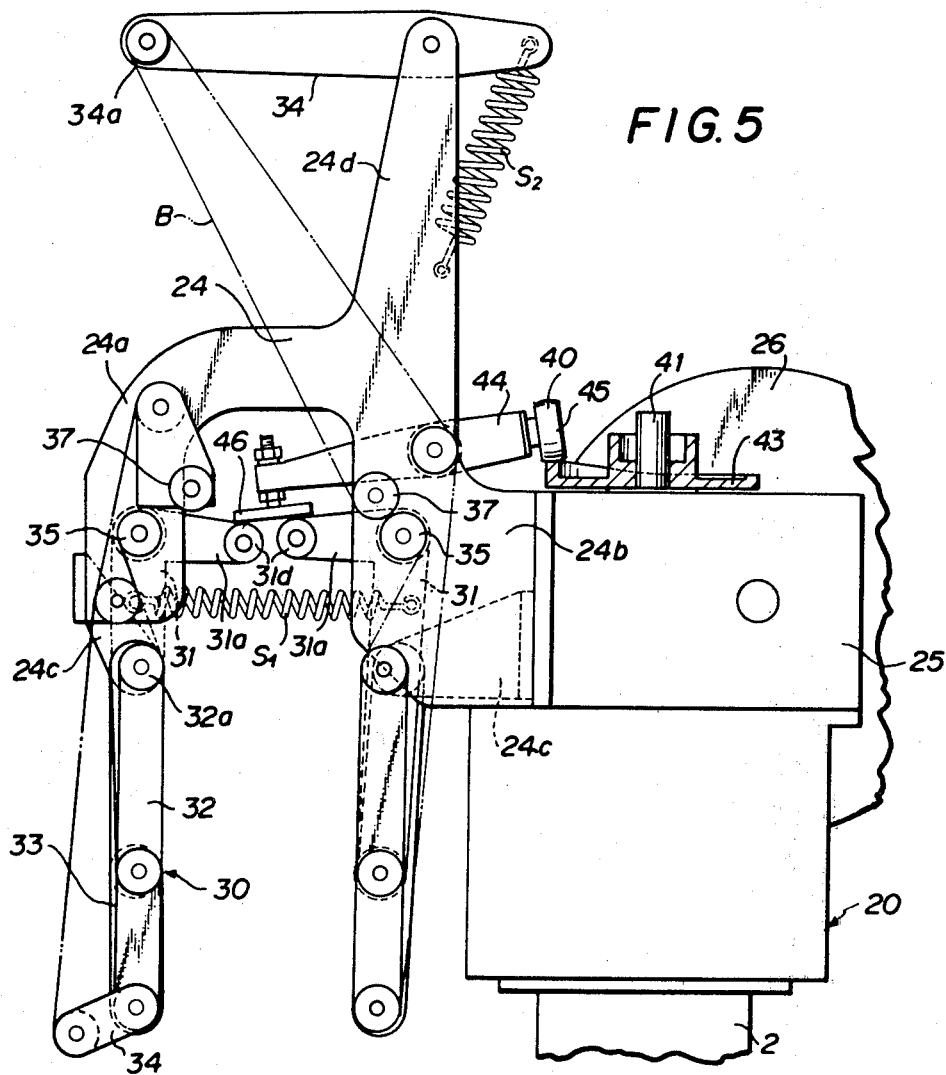

DEVICE FOR UNLOADING BOTTLE-SHAPED CONTAINERS

BACKGROUND OF THE INVENTION

This invention relates to a device for unloading a product or a light bottle-shaped container of synthetic resin formed through predetermined process line from a predetermined jig for engaging the product throughout the process line from a molding stage and externally discharging it.

In molding a bottle-shaped container of synthetic resin such as polyethylene terephthalate resin by means of an injection blow molding process, there is adopted an orientation blow molding process which has the steps of first molding a cylindrical piece with a bottom in advance as preformed piece by an injection molding machine, heating the piece to predetermined temperature, charging it into a mold, and biaxially orientation blow molding the piece to thus produce a final product. In order to largely increase the number of the products, such as bottle-shaped containers, to be molded per unit time in this case, the conventional process employs the steps of engaging the preformed primary piece in neck portion downward position with predetermined jig to load the preformed piece in the jig, and passing the preformed piece jig assembly through a heater and a biaxially orientation blow molding machine as it is in case of forming a bottle-shaped secondary container or product.

SUMMARY OF THE INVENTION

It is a primary object of this invention to provide a device for unloading a product or a bottle-shaped container which can extremely simply unload the product from a jig for engaging the product.

It is another object of this invention to provide a device for unloading a product or a bottle-shaped container which can continuously rapidly and exactly unload the product from the jig and supply it to the next step.

It is still another object of this invention to provide a device for unloading a product or a bottle-shaped container which can largely increase the number of the products molded per unit time.

The device for unloading a product or a bottle-shaped container according to this invention contemplates to unload the bottle-shaped container thus engaged in neck portion downward position with a jig and conveyed in the same position after being processed in the same position from the jig to feed the container to next step such as of filling it in a packaging box or the like. The device is assembled concentrically with a turntable rotating at constant speed for holding a number of orienting jigs at equal central angle intervals at the peripheral edge thereof for respectively holding the blow-molded containers as to rotate at the same speed in the same direction as those of the turntable within a predetermined angle and to unload the containers to then return to the original position so as to feed the containers to next stage such as filling the containers in a corrugated fiberboard box.

BRIEF DESCRIPTION OF THE DRAWINGS

The above and other related objects and features of the invention will be apparent from a reading of the following description of the disclosure found in the accompanying drawings and the novelty thereof pointed out in the appended claims.

FIG. 4 is a front view of the linkage shown in FIG. 3; and

FIG. 5 is a side view of the linkage in open state.

DETAILED DESCRIPTION OF THE PREFERRED EMBODIMENTS

Figure 1:
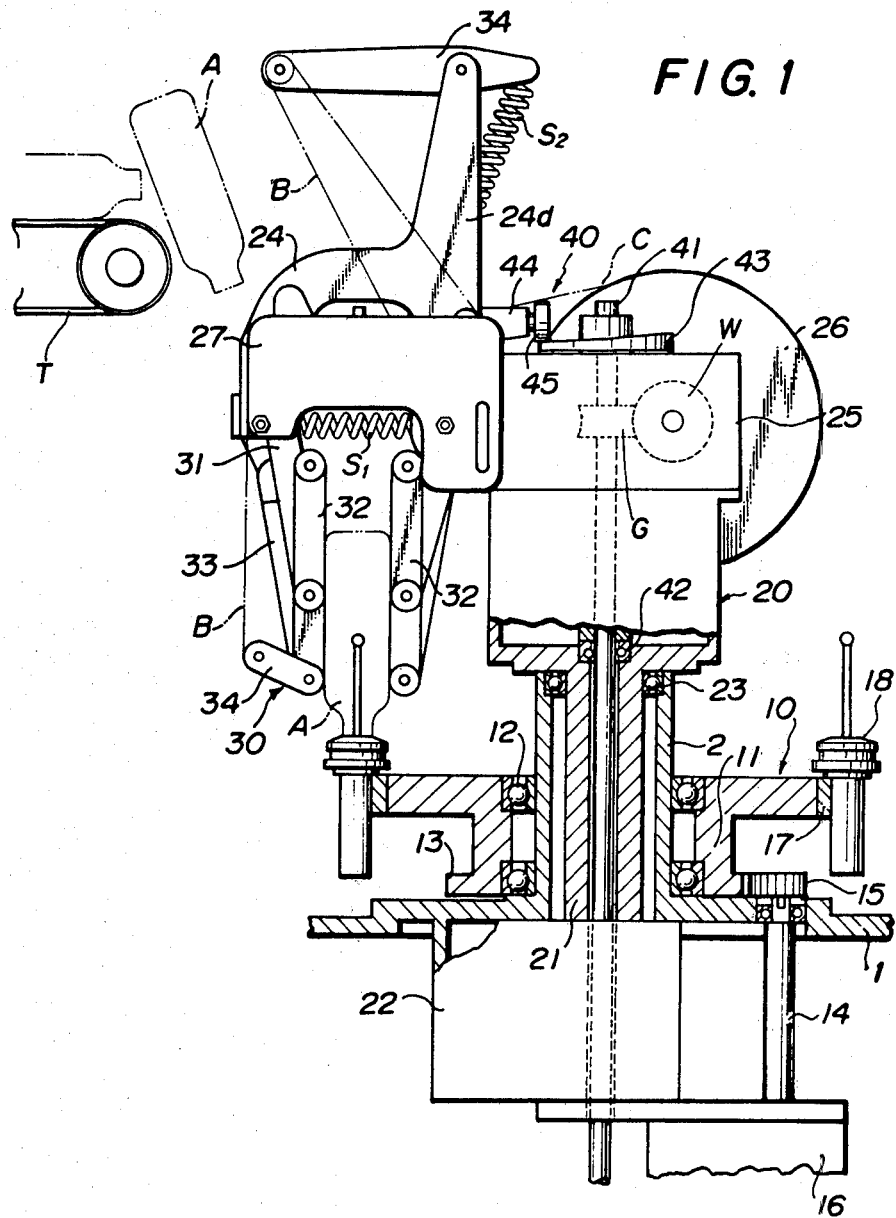
FIG. 1 is a partially fragmentary side view of one preferred embodiment of the device for unloading a product or a bottle-shaped container as a whole according to this invention.

Referring to the drawings, particularly to FIG. 1 showing one preferred embodiment of the device for unloading a product or a bottle-shaped container constructed according to this invention, wherein like reference numerals designate the same parts in the following views, a cylindrical column 2 is stored at the center of a base 1 provided adjacent to a biaxial-orientation blow molding machine (not shown), and a turntable 10 is assembled around the column 2.

A cylindrical sheath 11 is formed underneath the turntable 10. The turntable 10 is rotatably assembled via bearings 12 around the column 2 at the sheath 11. Teeth 13 are formed on the outer peripheral surface of the sheath 11 to engage in mesh with a gear 15 mounted at the upper end of a rotary shaft 14 protruded from the base 1. The turntable 10 is horizontally driven through the engagement of the teeth 13 with the gear 15 on the base 1 at predetermined constant speed. The rotary shaft 14 is engaged downwardly with a rotary index 16.

A plurality of strong magnets 17 (12 in this embodiment) are equi-angularly arranged at the upper peripheral end of the turntable 10 to magnetically attract respectively orienting jigs 18.

The jigs 18 hold preformed primary pieces at their ports and are thus passed through a heating unit as was described and are then converged to the turntable 10 in the state each for holding a bottle-shaped container blow-molded from the preformed piece by an orientation blow molding machine. These jigs 18 are unloaded from the bottle-shaped containers and will be then loaded with new preformed pieces and fed to the heating unit as will be described in greater detail.

A rocking unit or an oscillating drive mechanism 20 is so assembled concentrically with the turntable 10 as to ride on the column 2 of the base 1 and incorporates a cylindrical output shaft 21 passing within the column 2 therethrough and connected to a rockable index 22 mounted underneath the base 1. The output shaft 21 of the rocking unit 20 is rotatably engaged via bearings 23 with the column 2. The rocking unit 20 is operated as predetermined by the rockable index 22.

Figure 2:
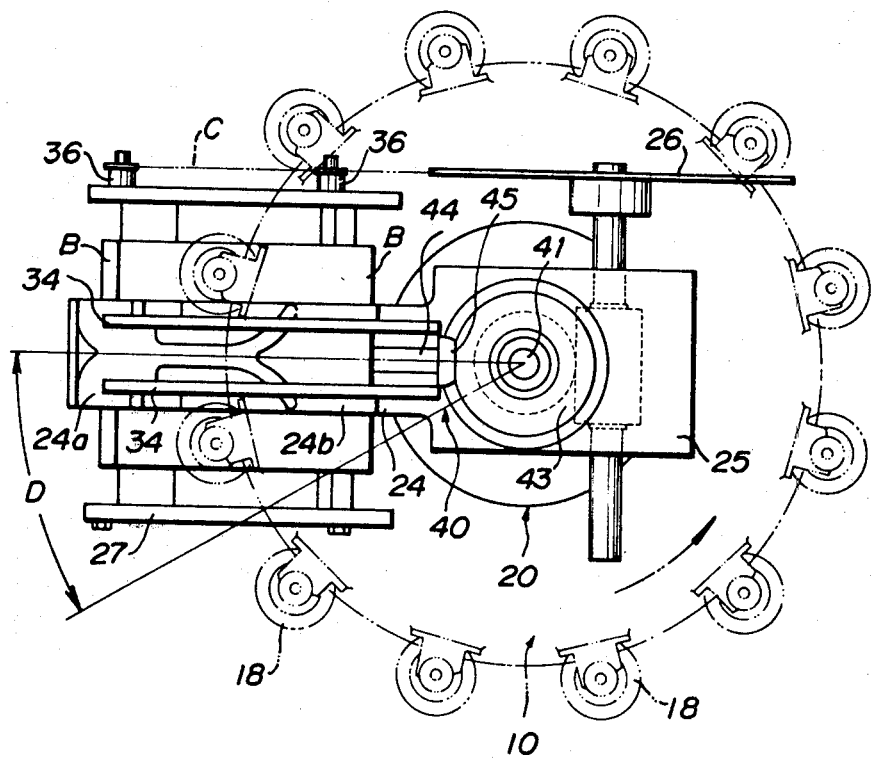
FIG. 2 is a plan view of the device shown in FIG. 1.

A device for unloading a product A or a bottle-shaped container of this invention is mounted at the rocking unit 20 as will be described in greater detail. The rocking unit 20 turns, when unloading the product A from the jig 18, at the same speed in the same direction as the turntable 10 within a predetermined angle (at 30° in this embodiment) (as designated by the interval D in FIG. 2) and the device unloads the product A in the meanwhile. The rocking unit then turns back to the original position at a speed faster than the speed of the turntable 10 after unloading the product A as an oscillation drive motion.

A supporting arm 24 is protruded from the top of the rocking unit 20 toward the peripheral end of the turntable 10. A pair of linkages or linking mechanisms 30 are supported by the supporting arm 24 to the rocking unit 20 at the position directly above the jigs 18 for unloading the product held by the jig 18 by holding the product in radial direction from the turntable 10.

In this preferred embodiment, two jigs 18 are simultaneously unloaded from the products by the linking mechanisms 30 by means of one rocking or oscillating motion of the rocking unit 20. Accordingly, a pair of linking mechanisms 30 are arranged in a combination of two sets at the supporting arm 24 to meet the interval between the adjacent jigs 18. A pair of the linking mechanism 30 are constructed as below.

The supporting arm 24 is so mounted at the rocking unit 20 as to bridge over the turning trace of the jigs 18 of the turntable 10. A pair of the linking mechanisms 30 are so arranged as to suspend toward the front portion 24a and the rear portion 24b of the supporting arm 24. Thus, a pair of the linking mechanism 30 can radially grasp to hold the product A or a bottle-shaped container held by the jig 18 located between the linking mechanisms 30 to unload the container from the jig 18.

The linking mechanism 30 incorporates an L-shaped arm 31, an unloading arm 32, a holding arm 33, and a lower arm 34 in combination. The L-shaped arm 31 is pivotally secured at one end thereof to the front portion 24a of the supporting arm 24 and at the other to the rear portion 24b of the arm 24 to be always urged to close toward the vertical portion 31b thereof and to be opened at the vertical portion 31b thereof against the tension of a spring $S_1$ to the roller 31d of the horizontal portion 31a thereof, wherein the horizontal portion 31a is disposed at the upper portion and hung at the vertical portion 31b and further rotatably secured at right angle portion 31c to the arm 24.

Drive rollers 35 are concentrically mounted at the side of the L-shaped arm 31 journaled via the right angle portion 31c as predetermined.

The unloading arm 32 is pivotally secured to the bottom of the vertical portion 31b of the L-shaped arm 31 at the center with a roller 32a projected at the same shaft as the pivotal portion thereof and both ends in predetermined direction.

The holding arm 33 is pivotally secured at the upper end thereof through the bracket 24c projected from the lower end of the arm 24 to the arm 24 and at the other to the lower end of the unloading arm 32 for holding the unloading arm 32 substantially vertically.

The lower arm 34 is provided with a roller 34a at one end thereof, and pivotally secured at the front portion 24a of the supporting arm 24 to the lower end of the unloading arm 32 and at the rear portion 24b of the arm 24 to the projected portion 24d situated at the rear portion 24b.

The linking mechanisms 30 are thus mounted at the supporting arm 24 integrally with the rocking unit 20. An endless largely frictional unloading belt B is engaged with the rollers 32a, 34a, and 35 of the linking mechanisms 30. As readily understood from FIG. 4, the respective rollers 32a, 34a and 35 are projected at the side to be disposed on the vertical line as seen from the front side.

The belt B is rotatably driven in predetermined direction of the respective drive rollers 35 wherein the drive roller 35 of the front portion 24a of the supporting arm 24 clockwise and the drive roller 35 of the rear portion 24b of the arm 24 counterclockwise to thereby hold the product engaged by the jig 18 and to unload it therefrom. The drive rollers 35 are driven in predetermined direction by transmitting the rotation of a large-diameter gear pulley 26 projected aside from the index 25 provided on the top of the rocking unit 20 through a chain belt C to small-diameter gear pulleys 36 projected aside from the supporting arm concentrically with the drive rollers 35. The gear pulley 26 is driven through a worm W engaged with the shaft of the gear pulley 26 by a worm gear G engaged with a rotary shaft 41, which will be described in greater detail.

It should be noted that the rollers engaged with the belt B are not limited only to the rollers 32a, 34a and 35, but a roller 37 or the like can also be suitably selected to be arranged in the vicinity of the roller 35 so as to exactly engage the belt B with the drive rollers 35.

In order to increase the tension of the belt B, it is preferred or necessary to provide a spring (not shown) for imparting the urging force downwardly at the pivotal portion of the arm 32 at the base end of the arm 34 of the front portion 24a of the supporting arm 24 or to connect a spring $S_2$ between the base end of the arm 34 of the rear portion 24b of the arm 24 and the projection 24d of the supporting arm with the arm 34 incorporating upward urging force.

A bracket 27 is provided to bridge between the linking mechanisms 30 for auxiliarily bearing the respective rollers, arms and the supporting arm 24.

The linking mechanism 30 is thus constructed, and a pair of the linking mechanisms 30 can grasp the product held by the jig 18 of the turntable 10 substantially in the radial direction of the turntable 10 to then unload it from the jig 18, and opens or close in radial direction by pushing the horizontal portion 31a of the L-shaped arm 31. After the linking mechanisms 30 unload the product A from the jig 18, it separates the product A upwardly to carry it on a belt conveyor T located above the mechanisms 30 by means of separating reaction as laid on the conveyor T and to then feed the product A to the next step.

Figure 3:
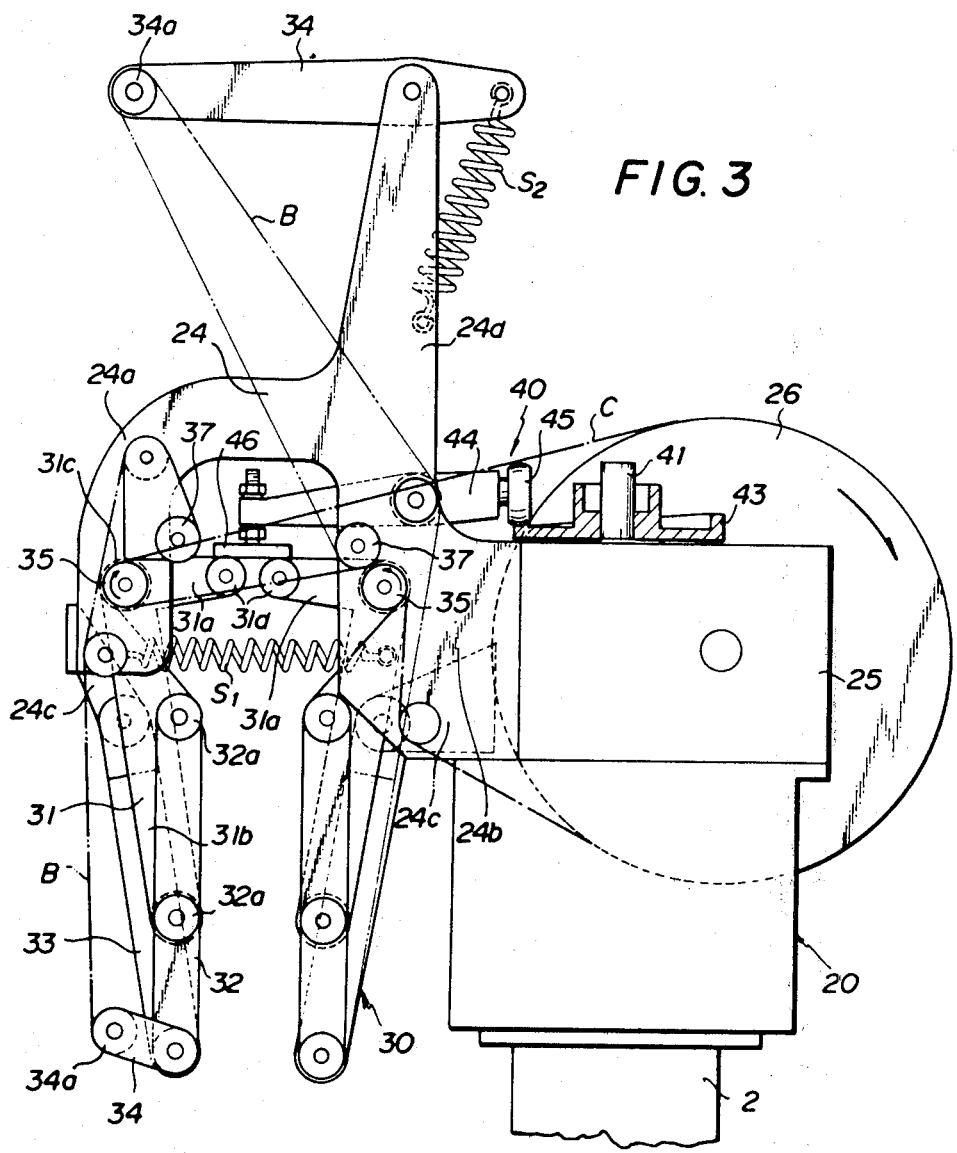
FIG. 3 is a side view of the linkage used in the device in closed state for holding the bottle-shaped container.

In FIG. 3, the linking mechanisms 30 approach to each other to close in radial direction by means of a spring $S_1$ for pulling therebetween (FIG. 1) since there is no urging force upwardly from the horizontal portion 31a.

As shown in FIG. 5, when an urging force is applied to the end of the horizontal portion 31a against the pulling force of the spring $S_1$, the vertical portion 31b is opened by the principle of a lever to open the linking mechanisms 30. Since the arm 33 is pivotally secured at the lower end thereof to the arm 33, the arm 32 can open or close while maintaining the vertical position thereof.

The device of this invention further incorporates a cam mechanism 40 to take a timing as predetermined in the opening and closing operations of the linking mechanisms 30.

The cam mechanism 40 employs a rotary shaft 41 rotating at predetermined constant speed relatively with the rocking unit 20 and passing through bearings 42 and the upper index 25 at the upper portion, and a circular disk 43 formed with oblique upper peripheral end surface with one thin peripheral end and thick peripheral cam end. A cam follower 45 is disposed at the thin peripheral end for closing the linking mechanisms 30 and disposed at the thick peripheral end for opening the linking mechanisms 30.

There is also provided a lever 44 at predetermined position of the rear portion 24b of the supporting arm 24 in pivotally secured manner, at one end of which lever 44 the cam follower 45 urged onto the end of the upper peripheral surface of the disk 43 is provided and at the other end of which lever 44 a pushing plate 46 for urging the respective rollers 31d mounted at the end of the horizontal portion 31a of the pair of L-shaped arms 31 is provided.

Since the cam follower 45 is disposed at the thin portion of the disk 43 by the rotation of the shaft 41 at the cam mechanism 40 in FIG. 3, a pair of the L-shaped arms 31 are pulled at the vertical portion 31b by the spring $S_1$ with the result that the upwardly pushing force is applied to the end of the horizontal portion 31a. As the lever 44 is lowered downwardly at the pushing plate 46 to push down the respective rollers 31d of the lever 44 when the shaft 41 is rotated to cause the cam follower 45 to be disposed at the thick portion of the disk 43 in FIG. 4, the L-shaped arms 31 are opened against the pulling force of the spring $S_1$. Inasmuch as the pushing plate 46 is upwardly urged by the horizontal portion 31a by means of the tension of the spring $S_1$ in both cases, the cam follower 45 disposed at opposite side of the lever 44 is always urging on the upper surface of the disk 43.

The device for unloading the product of this invention thus incorporates the turntable 10, rocking unit 20, linking mechanisms 30, and cam mechanism 40 and will operate as a whole as below.

The turntable 10 is turned at predetermined constant speed in predetermined direction (counterclockwise in FIG. 2) in the state for holding jigs 18 engaging respectively the bottle-shaped containers in neck portion downward position at the peripheral edge thereof. The rocking unit 20 rocks or oscillates at predetermined angle (at 30° in the embodiment) in the same direction at the same speed as the turntable 10 when the jig 18 is located at the position between a pair of the linking mechanisms 30 and then returns to the original position at a speed faster than the turning speed of the turntable 10.

The device thus unloads the product A from the jig 18 when the rocking unit 20 rocks or oscillates in a manner that the linking mechanisms 30 open and close to hold the product A when the rocking unit 20 starts rocking or oscillating operation and the bottle-shaped container of the product A held by the jig 18 turning at the same speed in the same direction as the turntable 10 is engaged with the unloading arms 32 of the linking mechanisms 30 via the belt B therebetween. That is, the disk 43 rotated via the shaft 41 of the cam mechanism 40 has predetermined relationship with respect to the turntable 10 in turning operation, wherein in this embodiment twelve jigs are arranged around the turntable 10 for unloading simultaneously two products with the result that the cam mechanism 40 operates six times the turning speed of the turntable 10, with a timing that the cam mechanism 40 operates when the rocking unit 20 starts rocking or oscillating operation to thereby hold the bottle-shaped container of the product as shown in FIG. 3. When the linking mechanisms 30 hold the bottle-shaped container, the gear pulley 26 is simultaneously rotated in predetermined direction by the index 25 to drive the belt B in predetermined direction to thereby unload the bottle-shaped container when the rocking unit 20 rocks or oscillates. However, it is noted that even if the belt B is always moved this operation can also be performed without difficulty.

It is appreciated that since the bottle-shaped container is unloaded from the jig while rocking or oscillating the rocking unit 20 at the same speed in the same direction as the turntable 10, there occurs no displacement between the bottle-shaped container and the belt B.

Thus, when the bottle-shaped container is unloaded to cause the rocking unit 20 to approach the forth moving limit, the linking mechanisms 30 are opened by means of the rotation of the disk 43 of the cam mechanism 40, and the rocking unit 20 returns to the original position in the same state to then unload the next bottle-shaped container.

It should be understood from the foregoing description that since the device for unloading the bottle-shaped containers of this invention can thus unload the containers passed through the biaxially orientation blow molding machine together with the heating unit when biaxially blow molding the preformed piece of synthetic resin while held by the jigs, it can extremely simply unload the bottle-shaped containers from the jigs. It should also be appreciated that since the device of this invention can thus continuously, rapidly and exactly unload the containers from the jigs, it can largely increase the number of the bottle-shaped containers as processed per unit time for mass production efficiency.

What is claimed is:

1. A device for unloading bottle-shaped containers comprising:
    turning means rotating at constant speed around a center thereof for holding a plurality of jigs for holding respectively bottle-shaped containers, at equal central angle interval at the peripheral end thereof,
    rocking means so assembled concentrically with said turning means as to ride on said turning means and to turn at the same speed in the same direction as said turning means within predetermined angle and then to return to the original position at a speed faster than the speed of said turning means, and
    a pair of linking mechanisms supported by a supporting arm, having front and rear portions, projected from said rocking means at the position directly above the jigs for radially grasping to hold the bottle-shaped containers engaged by the jigs located between said linking mechanisms to unload the container from the jig.

2. The device for unloading bottle-shaped containers according to the claim 1, wherein said turning means is a turntable incorporating a plurality of strong magnets for magnetically attracting the jigs respectively.

3. The device according to the claim 1, wherein said rocking means is an oscillating drive mechanism incorporating a cylindrical output shaft connected to a rockable index mounted underneath said turning means for driving the same.

4. The device according to the claim 1, wherein said linking mechanisms each comprises an L-shaped arm pivotally secured at one end thereof to the front portion of the supporting arm and at the other to the rear portion of the supporting arm, an unloading arm pivotally secured to the bottom of the vertical portion of the L-shaped arm at the center with a roller projected at the same shaft at the pivotal portion thereof, and a holding arm pivotally secured at the upper end thereof through the bracket projected from the lower end of the supporting arm to the arm and at the other to the lower end of the unloading arm.

5. The device according to claim 4, wherein the L-shaped arm is always urged to close toward the vertical portion thereof and to be opened at the vertical portion thereof against the tension of a spring to the roller of the horizontal portion thereof.

6. The device according to claim 4, wherein said linking mechanism further comprises a belt rotatably engaged with a drive roller mounted at the front portion of the supporting arm and a drive roller mounted at the rear portion of the supporting arm to thereby hold the bottle-shaped container engaged by the jig for unloading the container from the jig.

* * * * *